INVENTOR.
EDMUND LUDLOW,
BY
ATTORNEYS.

Patented Mar. 16, 1954

2,672,293

UNITED STATES PATENT OFFICE 2,672,293

VALVE

Edmund Ludlow, Columbus, Ind., assignor to Arvin Industries, Inc., Columbus, Ind., a corporation of Indiana Application August 14, 1950, Serial No. 179,160

1 Claim. (Cl. 237—8)

This invention relates to automobile-body heaters of the circulating fluid type in which the coolant employed in the automobile engine is circulated through a heat-radiating core. In most devices of this kind, a fan or blower is associated with the core to force air therethrough and to discharge it into the interior of the automobile-body.

It is an object of this invention to provide for such a heater an automatic control which will regulate the rate at which coolant flows through the heater-core in accordance with the temperature within the automobile-body. It is a further object of the invention to produce an improved valve adapted for automatic control and functioning to regulate the rate of coolant-flow through the heater. Still another object of the invention is to produce a temperature-responsive coolant-controlling mechanism which can be simply and economically manufactured and readily installed in automobiles of various types and sources of manufacture.

In carrying out the invention, the core of the automobile-body heater is connected into the coolant-circulating system of the automobile engine through a pressure-responsive valve. Such valve is controlled by intake-manifold pressure modified in accordance with the temperature within the automobile-body. The valve which I prefer to employ has a casing provided with a valve seat and a movable valve member in the form of a hollow sleeve of resilient material, such as rubber, provided with an integral head cooperating with the seat to regulate the rate of coolant flow. Movement of the valve-head is controlled by fluid pressure within a chamber of variable volume, which chamber may be or may include the interior of the valve-sleeve. The pressure chamber is connected to the intake manifold of the engine through a valve responsive to temperature within the automobile body, the arrangement being such that a decrease in the temperature within the automobile body will cause the temperature-responsive valve to alter fluid pressure within the pressure chamber of the coolant valve in a manner which will result in opening of such coolant valve.

Figure 1:
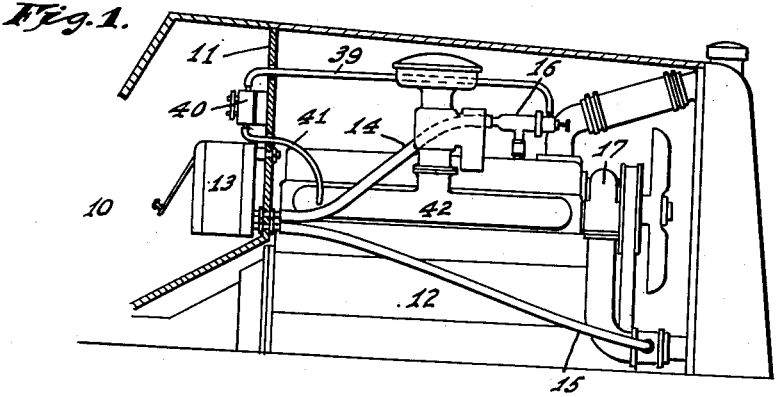
Figure 2:
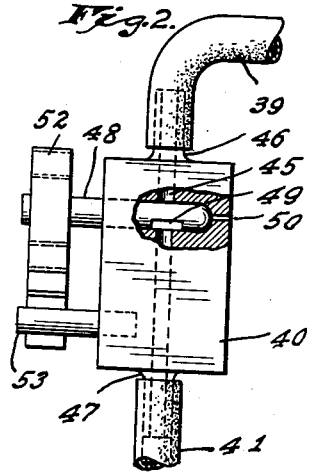
Figure 3:
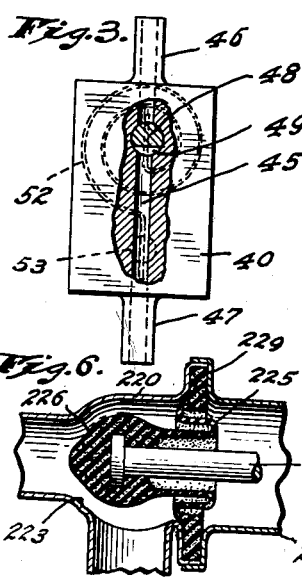
Figure 5:
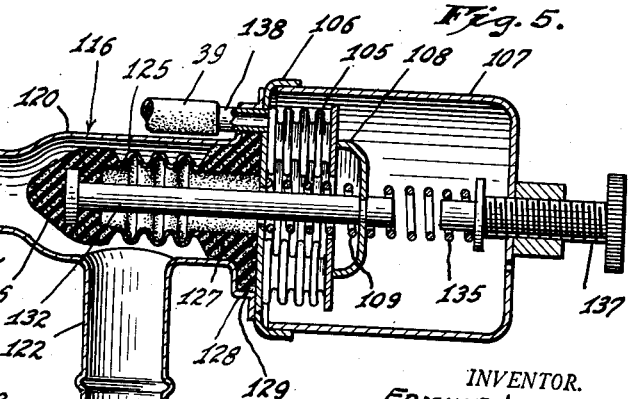
Figure 6:
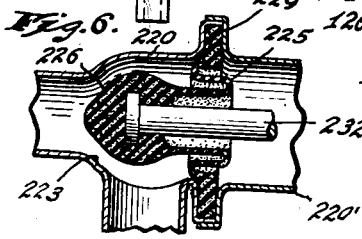

The accompanying drawing illustrates the invention; Fig. 1 is a fragmental sectional view illustrating somewhat diagrammatically the front end of an automobile in which my invention has been embodied; Figs. 2 and 3 are elevations in partial section illustrating details of a preferred form of temperature-responsive valve; and Figs. 4, 5, and 6 are fragmental axial sections illustrating different forms of coolant-valve.

In Fig. 1, I have indicated an automobile having a passenger compartment 10 defined at its front end by a dash 11, an engine 12 ahead of such dash, and a heater 13 mounted on the dash within the passenger compartment. The heater embodies a heat-exchanging core (not shown) connected through a supply hose 14 and a return hose 15 into the cooling system of the engine 12. As shown, the supply hose 14 communicates with the water jacket of the engine through a coolant-control valve 16, while the return hose 15 communicates with the inlet of the coolant-circulating pump 17. In the operation of such a heating system, some of the coolant circulated through the jacket of the engine flows through the supply hose 14 to the heater and is returned from the heater to the engine cooling system through the return hose 15. Within the heater, the coolant gives up heat to a moving stream of air which discharges into the passenger compartment 10. Details of the heater 13 are not shown, as they form no part of my invention, may vary widely, and are well known.

Figure 4:
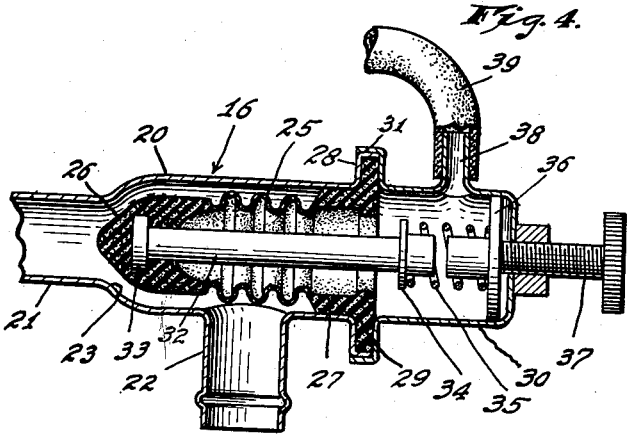

One form of valve 16, which controls the flow of coolant from the engine to the heater, is illustrated in greater detail in Fig. 4. As there shown, it comprises a generally cylindrical body 20 having an axially projecting outlet nipple 21 adapted for connection to the supply hose 14 and a lateral inlet nipple 22 adapted for connection to the water jacket of the engine. The tapered shoulder between the valve-body 20 and the smaller-diameter outlet nipple 21 is employed as a valve seat 23. Within the valve body 20 there is disposed a unitary valve member formed of rubber or similar resilient material, such valve member being shown as comprising a corrugated tubular portion 25, a thickened head 26 at one end, and a thickened rim 27 at the other end. The valve body 20, which is desirably formed of sheet metal, has at the end opposite the outlet nipple 21 a portion 28 of larger diameter than the valve body and providing a seat for an annular flange 29 on the rim 27. A cup-like cover 30 having an enlarged open end portion 31 receiving the end portion 28 of the valve body seats against the outer face of the flange 29 and is secured in place on the valve body in any convenient fashion. A rigid valve stem 32 having an enlarged end 33 embedded in the head 26 of the valve member extends rearwardly through the valve member and into the cover 30, where it is provided with a shoulder 34. A helical compression spring 35 acts between the shoulder 34 and a plunger 36 axially slidable in the cover 30 and adapted to be engaged by the inner end of an adjusting screw 37 screw-threadedly mounted in the outer end of the cover. The cover 30 is provided with a laterally projecting nipple 38 adapted for connection to a flexible hose 39, the purpose of which will hereinafter become apparent.

In the valve 16 as so far described, the spring 35 urges the valve-head 26 into engagement with the valve seat 23 with a force which can be varied by adjustment of the screw 37. The interior of the hollow valve member communicates with the interior of the cover 30 through a central hole in the rim 27 to define a pressure chamber with which the hose 39 communicates through the nipple 38. If a partial vacuum is created within such pressure chamber, and if such vacuum is high enough, the valve-head 26 will be drawn rearwardly away from the valve seat 23 against the force exerted by the spring 35. Accordingly, by applying a vacuum to the pressure chamber, the valve 16 will be opened to permit the flow of coolant from the engine to the heater 13, and the rate of coolant flow can be varied by varying the degree of vacuum within the pressure chamber.

To control the application of vacuum to the pressure chamber of the valve 16, the hose 39 is connected through a control valve 40 to a second hose 41 leading to the intake manifold 42 of the engine 12. As shown in Figs. 2 and 3 the valve 40 comprises a body having a central passage 45 terminating at opposite ends in nipples 46 and 47 adapted for respective connection to the hoses 39 and 41. Intersecting the passage 45 is a recess which rotatably receives a valve member 48, such valve member extending across and closing the passage 45 and being provided in the plane of such passage with a notch or groove 49. A restricted bleed opening 50 provided in the valve body communicates with the recess in which the valve 48 is located, and such valve fits the recess loosely in order that the vacuum in the intake manifold 42 may induce a flow of air inwardly through the bleed opening 50, the valve-body recess, the lower portion of the passage 45, and the hose 41 into the intake manifold. The rate of such flow, and hence the static pressure in the valve-receiving recess, will depend upon the angular position of the valve 48. As shown, the notch 49 is in alignment and in communication with the lower portion of the passage 45, with the result that partial vacuum within the recess is at a maximum. Such partial vacuum transmitted through the tube 39 to the pressure chamber of the valve 16, will move the valve-head 26 from its seat 23 and permit hot coolant to flow through the heater 13.

As the valve 48 is rotated to carry the notch 49 out of alignment with the lower end of the passage 45, the lower portion of such passage will be covered by the unnotched portion of the valve, thus restricting or shutting off entirely air flow from the bleed opening 50 through the recess and lower portion of the passage 45. In this condition, the static pressure within the valve-receiving recess will be atmospheric or substantially atmospheric, with the result that the spring 35 in the valve 16 will force the valve-head 33 into engagement with its seat 23 and prevent coolant-flow to the heater 13. In intermediate positions of the valve 48, the partial vacuum within the valve-receiving recess will be intermediate its maximum and minimum values and the valve-head 26 will occupy a position intermediate its fully closed and fully opened positions.

By controlling the position of the valve 48 about its axis in accordance with the temperature in the passenger compartment 10, the valve 16 may be regulated automatically to supply coolant in the quantity necessary to maintain a desired temperature within the passenger compartment. For this purpose, the valve 48 may be secured to the inner end of a spirally coiled bimetal strip 52 the outer end of which is anchored to the body of the valve, as by a pin 53. Conveniently, the ends of the bimetallic strip 52 extend through slots in the valve 48 and pin 53, respectively.

In the condition assumed in the drawing, the temperature of the passenger compartment 10 is well below that which it is desired to maintain therein, and the bimetallic strip 52 positions the valve 48 to create within the pressure chamber of the coolant-valve 16 a vacuum of the maximum value, thus causing the valve-head 26 to occupy its fully opened position. As a result, the rate of coolant-flow through the heater 13 will be a maximum. As the temperature within the passenger compartment 10 increases, the bimetallic strip 52 rotates the valve 48 to move the notch 49 progressively out of alignment with the lower portion of the passage 45, thus reducing the vacuum in the pressure chamber of the coolant-valve 16 and permitting the valve-head 26 to move toward closed position under the influence of the spring 35. When the temperature in the passenger compartment 10 is at or above that desired, the notch 49 in the control valve 48 will be moved out of register with the lower portion of passage 45, the vacuum in the pressure-chamber will be a minimum and the valve-head 26 will be seated to prevent any coolant flow through the heater. The temperature automatically maintained in the passenger compartment by the apparatus described may be varied by adjustment of the screw 37. By adjusting such screw to move the plunger 36 inwardly, the temperature maintained in the passenger compartment may be lowered; and a higher degree of vacuum in the pressure chamber will then be necessary to open the coolant valve. Adjustment of the screw 37 in a sense which will permit outward movement of the plunger 36 will, on the other hand, reduce the effort exerted on the valve stem 32 by the spring 35, and the valve 16 will open at lower degrees of vacuum.

In the modified form of coolant control valve 116 illustrated in Fig. 5, the valve body 120 is provided with outlet and inlet nipples 121 and 122 generally similar to the corresponding portions of the valve 16. The valve body shown in Fig. 5 is likewise similar to the valve body in Fig. 4, having a corrugated tubular portion 125, a head 126, and a rim 127, the rim having a flange 129 received in an enlarged portion 128 at the open end of the valve body. In Fig. 5, the interior of the valve member does not form a part of the pressure chamber; but instead is constituted by an annular bellows 105 of the Sylphon type through which the valve stem 132 extends. A cover disk 106 secured in any appropriate manner to the open end of the valve body 120 holds the resilient flange 129 of the valve member in place and is provided at its periphery with a flange receiving the open end of a cup-like housing 107. The bellows 105 acts between the cover disk 106 and an abutment 108 secured to the valve stem 132. A helical compression spring 109 likewise acting between the cover disk 106 and the abutment 108 urges the valve-head 126 away from its closed position in opposition to a second compression spring 135 with which there is associated an adjusting screw 137. A nipple 138 extending through the enlarged end of the valve body 120, the flange 129, and the cover disk 106 provides for communication between the interior of the bellows 105 and the hose 39.

In the coolant-control valve of Fig. 5, vacuum in the bellows 105, aided by the spring 135, tends to seat the valve-head 126 in opposition to the force exerted on the valve stem 132 by the spring 109. In the sense that vacuum within the pressure chamber (the bellows 105) acts to close rather than to open the valve, the valve of Fig. 5 operates reversely from that of Fig. 4. Accordingly, the temperature-responsive valve of Figs. 2 and 3, when adapted for use with the coolant-control valve of Fig. 5, is arranged so that the valve member 48 occupies the position indicated when the temperature within the passenger compartment 10 is at or above the desired temperature. In this condition, the notch 49 registers with the lower portion of the passage 45 and the vacuum in the bellows 105 is at a maximum. The bimetal strip 52, in event of a drop in temperature in the passenger compartment 10, rotates the valve member 48 to effect a decrease in the vacuum with the bellows 105 and a consequent opening of the coolant-control valve, the extent of opening depending upon the extent to which the notch 49 in the valve member 48 is moved out of registry with the passage 45. The temperature at which the valve 116 opens can be varied by adjustment of the screw 137, inward movement of such screw raising the temperature at which the valve opens, and vice versa.

The particular form of coolant-valve member illustrated in Fig. 6 can be used as a substitute for either of the members illustrated in Figs. 4 and 5. Such valve body is formed of resilient material and comprises a head 226 adapted to engage a seat 223 in the valve body 220 to close the valve. The valve member has an integral flange 229 which is connected to the valve-head 226 by a flexible corrugated portion 225. The corrugated portion 225, however, instead of extending axially as in the valve member shown in Figs. 4 and 5, extends generally radially, and its corrugations are concentric and of different diameters. The valve body is held in place by clamping the flange 229 between two valve-body portions 220 and 220', and the valve stem 232 extends from the valve head for cooperation with vacuum-responsive means which may be of either of the type indicated in Figs. 4 and 5.

I claim as my invention:

In an automobile-body heating system, a heater, conduits for connecting said heater into the cooling system of an automobile engine, a valve in one of said conduits for controlling flow of liquid through said heater, said valve comprising a housing having inlet and outlet openings and an open end coaxial with and spaced from one of said openings, a closure for said open end, an axially extensible and contractable sleeve-like element of resilient material closed at one end and having at the other end an outwardly projecting annular flange clamped between said closure and housing whereby the closure and sleeve-like element define a pressure chamber the volume of which varies with extension and contraction of the sleeve-like element, the closed end of the sleeve-like element having a head constituting a valve member co-operating with the housing-opening coaxial with the open housing-end to regulate flow through the housing, and temperature-responsive means for controlling the pressure in said chamber.

EDMUND LUDLOW.

References Cited in the file of this patent
UNITED STATES PATENTS

| Number | Name | Date |
| --- | --- | --- |
| 1,764,799 | Hysor | June 17, 1930 |
| 1,779,503 | Swindin | Oct. 28, 1930 |
| 2,304,642 | Hans | Dec. 8, 1942 |
| 2,421,565 | Klug | June 3, 1947 |